May 12, 1959  W. A. BISHMAN  2,886,099
TREAD COMPRESSING TYPE TIRE BEAD SEATING DEVICE
Filed April 25, 1955  3 Sheets-Sheet 1

INVENTOR.
WALTER A. BISHMAN
BY
ATTORNEYS

May 12, 1959 W. A. BISHMAN 2,886,099
TREAD COMPRESSING TYPE TIRE BEAD SEATING DEVICE
Filed April 25, 1955 3 Sheets-Sheet 2

INVENTOR.
WALTER A. BISHMAN
BY
ATTORNEYS

May 12, 1959 W. A. BISHMAN 2,886,099
TREAD COMPRESSING TYPE TIRE BEAD SEATING DEVICE
Filed April 25, 1955 3 Sheets-Sheet 3
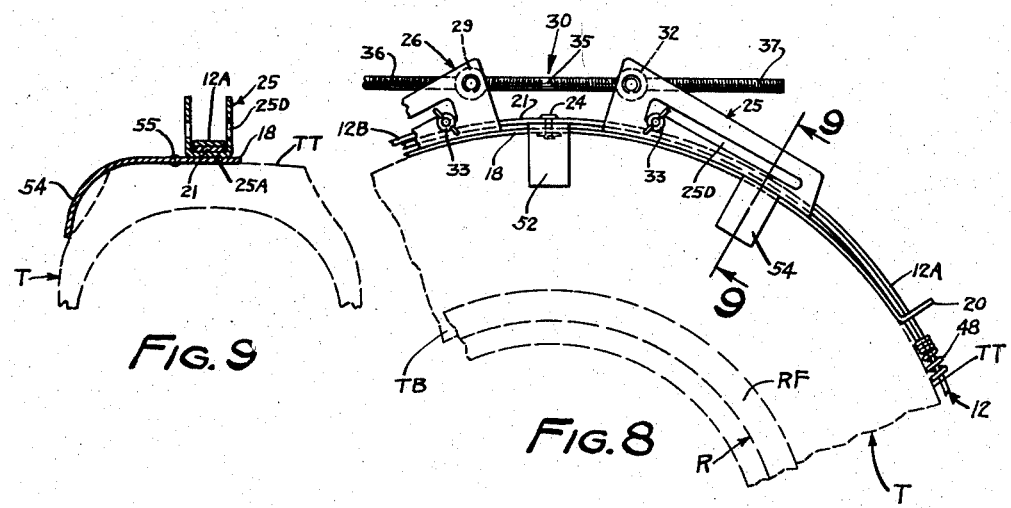
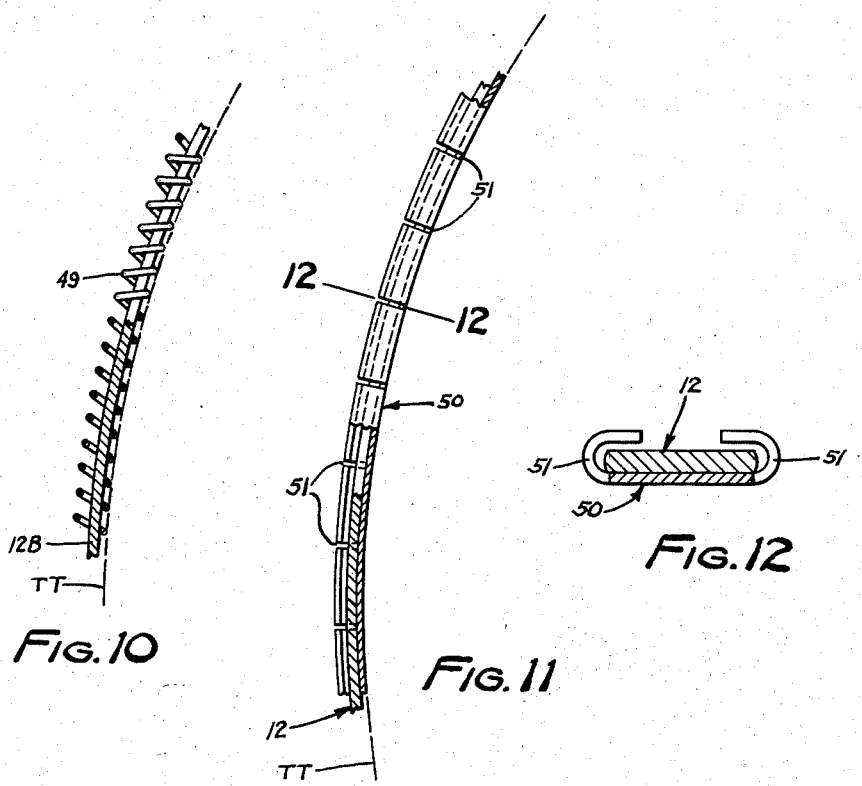
INVENTOR.
WALTER A. BISHMAN
ATTORNEYS

United States Patent Office 2,886,099
Patented May 12, 1959

2,886,099
TREAD COMPRESSING TYPE TIRE BEAD SEATING DEVICE

Walter August Bishman, Minneapolis, Minn., assignor to Bishman Manufacturing Company, Osseo, Minn., a corporation of Minnesota Application April 25, 1955, Serial No. 503,652

3 Claims. (Cl. 157—1.21)

This invention pertains to that class of tools which is suitable for preliminary deflecting the casing of the so-called "tubeless tires" for initially setting the beadings of the tires against the flanges of the rim with which such tire is assembled in use. Tires used for automobiles and trucks have, in our times, undergone a remarkable transition in construction. When, at the turn of the century, automotive vehicles were first being constructed, the tires in common with all other elements of the vehicles were built in a variety of ways. In these days each designer, who was frequently also the builder of the vehicle, had his own ideas and standardized constructions were unheard of. This period of experimentation in vehicular and tire designs was, however, soon ended, and by the 1920's tire designs had become standardized, at least insofar as that element in design which prescribed the use of a "casing" and an "innertube." Of these two fundamental elements, the "inner tube" was the air-holding device, whilst the "casing" formed the torus which at once protected the inner tube and formed the wheel rim. Many improvements, however, have been made in these elements which have had the effect of yielding much greater tire service, but while such improvements have included better and tougher rubber compounds, stronger reinforcement, better road-gripping surfaces, more resiliency and longer life designs, still the tire designer, until very recently (i.e., the 1950's), still adhered to the fundamentals of utilizing an "inner tube" and "casing," each a separate entity having a distinct purpose.

In the standardized design the "casing" is torus-shaped but open on the surface of inner radius, being thus formed with two edges or beads. These edges or beads in the standardized design have a cross-section resembling a right triangle, the two right-angular legs of the triangle being adapted to face outwardly against the rim flanges and the hypothenuse being toward the interior of the tire. The normal modern tire rim is a unitary band quite airtight and with two outwardly directed flanges, and it is between these that the casing beads are situated and against which they face.

Now, with the advent of the so-called "tubeless tire," the casing superficially at least, resembles the prior casing used with an "inner tube." The size and shape of the tubeless tire is so much the same as the prior casing that tubeless tires can with minor adaptation be mounted on the same rims as previously used with tires of casing and innertube construction. To achieve this adaptation a valve stem is fitted to the rim and the rim flanges which face the casing beads are cleaned thoroughly. It is then only necessary to mount the "tubeless tire" on the rim and inflate it. This simplicity in mode of adapting the newer tubeless tires to previously manufactured automotive wheel rims has done much to facilitate conversion to the more modern design.

While essentially a misnomer, the term "tubeless tire" is currently used to denominate the single casing plus tire rim form of assembly above described, and such term "tubeless tire" will be used hereinafter in conformance with present nomenclature.

One difficulty is encountered in connection with the use of the tubeless tire, namely the difficulty of making the tire-rim assembly initially tight for inflation. It will be appreciated that the air-containing torus is actually composed of two widely different elements, namely (1) the steel rim, and (2) the reinforced rubber casing. These fit together at the two tire-bead-rim flange contacting surfaces to make up the air holding assembly. In tubeless tires there are frequently provided soft sealing strips running along that part of the beads which lie against the rim flanges and this effects a good pneumatic seal provided the beads are pushed against the rim flanges. The air under pressure in the inflated tire will provide the necessary push to effect seal once inflation is effected, but some push of the tire beads toward the flange is initially needed to effect a preliminary closure of the tire-rim assembly, so that air will be held.

It is to the solution of this problem of facilitating the initial inflation that this invention is directed.

For purposes of this application the term invention will be understood to be inclusive of the meaning of the word discovery and that the subject to which this invention is directed is the science and useful art of pneumatic tires for vehicles. It is an object of the present invention to provide certain advancement and improvement in such science and useful art.

More particularly, it is an object of this invention to provide an instrumentality by which a tire portion of a tubeless-tire and rim assembly may be deflected initially so as to force the tire beads away from each other and into contact with the flanges of the rim for effecting initial sealing of the beads to the rim flanges preparatory to inflation.

It is a further object of the invention to provide a mechanism of durable construction for circumferentially contracting a tubeless tire casing at the tread.

It is another object of this invention to provide a mechanism which is easily adjustable and fast operating for circumferentially contracting the tread of tubeless tires preparatory to inflation.

It is another object of this invention to provide a mechanism for applying a circumferential hoop-pressure uniformly to a tubeless tire for deflecting said tire preparatory to inflation.

It is yet another object of the invention to provide a simple device by which hoop tension may be applied to various sizes of tubeless tires, by means of a portable device applied to such tire.

Other and further objects are those inherent in the apparatus herein illustrated, described and claimed.

The invention is illustrated with reference to the drawings in which:

In Figure 4 the operating screw and the tire are shown in plan.

Figures 8 and 9 illustrate a further modification of structure of the operating mechanism, Figure 8 being a fragmentary plan view of the bead expander in place on the tire and Figure 9 a fragmentary sectional view along the line and in the direction of arrows 9—9 of Figure 8.

Figures 10 and 11 are corresponding fragmentary enlarged side elevational views of a part of the hoop construction, each partly sectioned. Figure 10 is an enlargement of the form of construction shown in Figure 1; Figure 11 shows an alternative form.

Figure 12 is a sectional view taken along the line 12—12 of Figure 11.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 3:
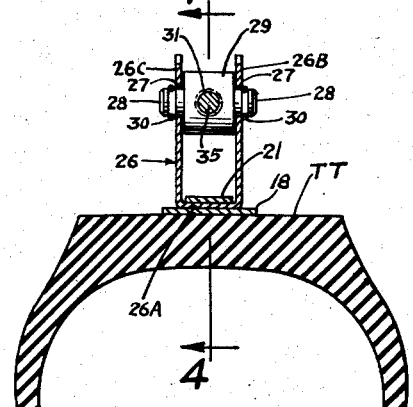
Figure 3 is a further sectional view thru the tire and bead expander at another place around the tire, this figure being taken along the line and in the direction of arrows 3—3 of Figure 1.

Referring to the drawings, particularly Figures 1–5 and 10 at T, there is shown a tubeless tire which is mounted on a standard drop-center rim R, which may, if desired, be made integrally with the wheel W. The tire, wheel and rim are of standard construction, and as they form no part of the present invention, they are conventionally illustrated and will not be specifically described. The rim has an inflation stem at S thru which air under pressure may be injected into the tire, where it is retained by a valve, not illustrated, in the inflation stem. The rim has flanges RF—RF, Figure 3, against which the tire beads TB are adapted to be retained. Air under pressure exerts pressure uniformly within the tire and this pressure, illustrated by arrows 10—10, Figure 3, firmly seals the beads TB against the rim R and its flanges RF. At the outset, however, before inflation, there is no pressure at 10—10. According to this invention it has been discovered that when hoop tension is exerted circumferentially on the tire tread TT, the resultant forces will move the tire beads TB in the direction of arrows 11A—11A and 11B—11B, as shown in Figure 3, thereby preliminarily sealing the beads TB to the rim flanges RF and rim R. To effect application of hoop pressure uniformly to the tire tread, there is according to this invention provided the following mechanism:

At 12 there is provided a hoop of metal which is somewhat flexible and is fashioned to encircle the tire tread TT for all but a short span. The flexibility will allow the hoop to conform to a range of tire sizes for which the device is adapted. The hoop 12 is preferably, though not necessarily, made in two parts 12A and 12B, the ends being slightly offset so as to face against opposite sides of clip 14, see Figures 1 and 2. The clip 14 is bent so as to reach inwardly (in respect to the tire) and hence along the sidewall of the tire and it therefore holds the hoop 12 from falling down, as when the bead expander is applied while the tire is resting flat on a floor. The two parts of the hoop, namely, 12A and 12B, are fastened together and to clip 14 by bolts or rivets 15.

Figure 1:
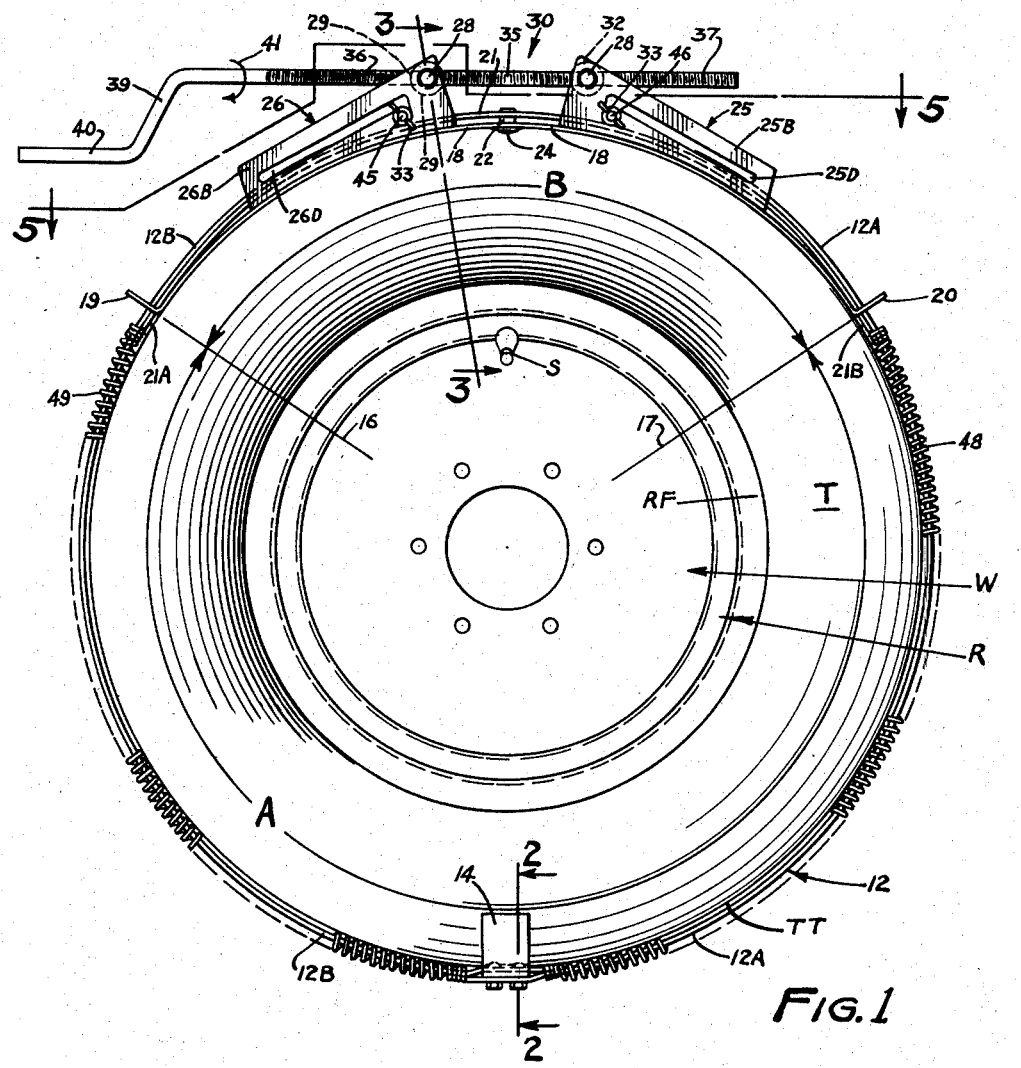
Figure 1 is a side view of a tubeless tire-rim assembly showing one illustrative form of bead expander of the present invention in operative position thereon.
Figure 2:
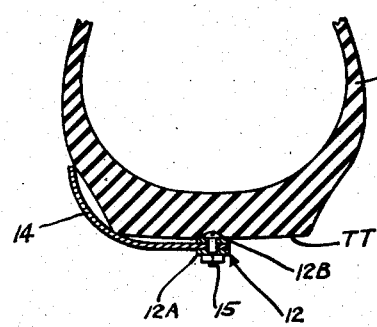
Figure 2 is a fragmentary sectional view thru a portion of the tire and bead expander taken along the line and the direction of arrows 2—2 of Figure 1.

As shown in Figure 1, the hoop 12 circumscribes the tire tread TT throughout the arc A which is the major portion of the way around the tire. Arc A need not be a precise angular distance but merely most of the way around the tire so as to leave a certain arcuate space B, which is the balance of the way around the tire. The mechanism for tightening the hoop is situated in space B. Thus from radius 16 to radius 17 there extends an arcuate plate or metal strip 18 having outwardly bent tips 19 and 20. Plate 18 is wider than hoop 12; it is somewhat flexible so it will bend and conform to a reasonable range of tire diameters, and it forms the base of the hoop tensioner generally designated 30. The outwardly bent ends 19 and 20 are each provided with an aperture, as at 19A and 20A, see Figure 4, thru which the hoop portions 12B and 12A pass.

Figure 4:
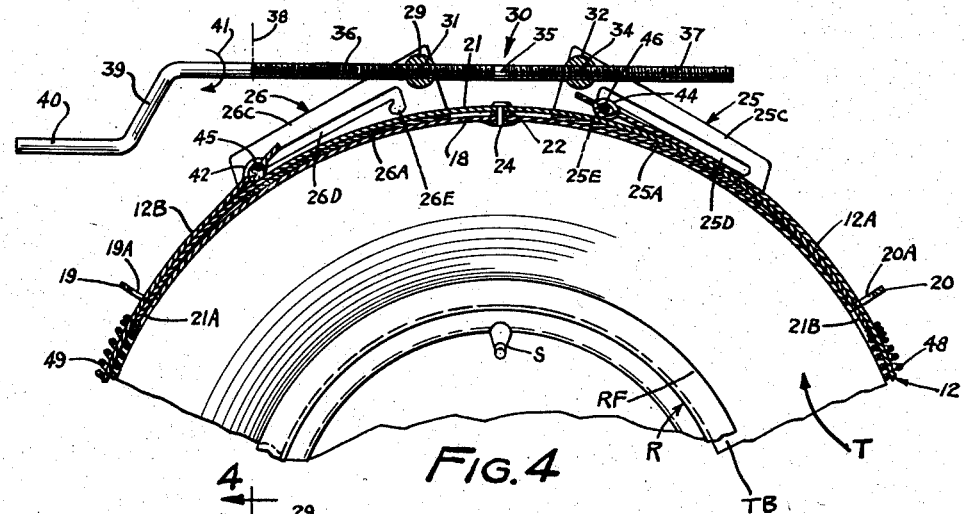
Figure 4 is a fragmentary sectional view parallel to the plane of the tire, illustrating the operating mechanism of the bead expander in section at the plane 4—4 of Figure 3.

The hoop tensioner 30 includes base strip 18 (which is wider than hoop strips 12A and 12B) and another strip 21, the latter being the same width as hoop pieces 12A and 12B, see Figure 3. The strip 21 is arcuately longer than the arcuate distance between portions 19 and 20 of strip 18, and extends outwardly thru the slots 19A and 20A. Thus, strip 21 has an end 21A which sticks out thru slot 19A and an end 21B which sticks out thru slot 20A. Strip 21 is not attached to the underlying strip 18 except at the middle where it is riveted or otherwise attached in spaced relation. Thus, as shown in Figures 1 and 4, a spacing washer 22 is provided between the strips 18 and 21 and a thru rivet 24 passes completely thru the two strips and holds them firmly together, but spaced by washer 22. At each side of the rivet 24, the two spaced strips 18 and 21 thus form tracks. The ends of strip 21 (i.e., ends 21A and 21B) are free to move up and down within the limits of slots 19A and 20A but sidewise or twisting movement of strip 21 relative to strip 18 is limited because slots 19A and 20A are only a little wider than the width of strips 12A and 12B and strip 21. At each side of rivet 24 there is provided a slider, i.e., sliders 25 and 26, these being identical. Sliders 25 and 26 are pressed into a channel form with a curved base web (25A and 26A) and parallel upstanding side flanges (25B—25C and 26B—26C). These side flanges are taller at the ends facing rivet 24 and are each apertured to receive a threaded nut. Thus, slider 26 has holes 27—27 in the side flanges thru which extend the stub shaft ends 28—28 of the nut 29. Each stub shaft has a little groove cut in it to receive a spring key 30—30, which thus retains the shafts 28—28 from displacement, should there be any tendency for flanges 26B and 26C to spread. Then thru the body of nut 29 there is a threaded aperture 31. The shape and general arrangements of nut 29 in slider 26 and the nut 32 in slider 25 are identical except that aperture 31 of nut 29 of slider 26 has a left-hand thread and aperture 34 in nut 32 of slider 25 has a right-hand thread. A shaft 35 is provided with a left threaded portion 36 (which works in nut 29) and a right threaded portion 37 (which works in nut 32). The portion of shaft 35 to the left of line 38, Figures 1 and 4, has a diameter slightly less than the root diameter of the threads 36 so nut 29 can be put on. This is done and the shaft 35 is bent to provide crank 39 and crank handle 40. Of course, nut 32 can be put on from the free end. When crank 39 (and shaft 35) are rotated clockwise, as shown by arrow 41, the nuts 29 and 32 will be moved towards each other and sliders 25 and 26 will consequently likewise be moved towards each other. When the shaft 35 is rotated in the opposite direction the sliders 25 and 26 will be moved away from each other. Each of the nuts 29 and 32 will pivot on its stub shafts 28—28 in its slider sufficiently to keep aligned with screw shaft 35. The elevation of the axis of the nuts 29 and 32 above strip 21 is sufficient to provide clearance of shaft 35 in respect to strip 21 when the sliders 25 and 26 are moved a maximum distance apart, it being remembered that such maximum movement is for a larger tire diameter and hence the flexure of strips 18 and 21 will be less than shown in the drawings.

It will be noted that strip 21 passes between the side flanges of the sliders, hence holds the slider aligned with strip 21, therefore also with strip 18. The curvature of the bases 25A and 26A of each slider (as viewed in Figures 1 and 4) is an average, somewhat between that corresponding to the largest and smallest tire on which the device is used.

In the side flanges of each slider there are formed elongated slots (25D and 26D) generally parallel to the base web of the slider, the slots on the opposed flanges being parallel. In the ends of the slots nearest the nuts 29 and 32 there are bayonet notches (25E and 26E). Each of the hoop straps 12A and 12B is brought up thru the slots (20A and 19A) respectively, and in a position over the underlying ends (21B and 21A) of the strip 21 which also pass thru said slots. Then the ends of the hoops are provided with eyes 42 and 44 thru which bolts 45 and 46 are passed. The bolts 45 and 46 are long enough to reach thru the slots (25D and 26D) of the sliders 25 and 26 and each bolt is equipped with a wing nut 33.

In the device shown the eyes 42 and 44 are each made by making parallel slits in an end of the hoop. Then the portion between the slits is bent up and the portions outside the slits is bent down, so as to make an integral eye which cannot uncurl, as the tension is considerable. The ends of the hoop portions 12A and 12B are hence anchored to bolts 46 and 45 respectively, and these are anchored thru slots 25D and 26D to the correspondingly numbered sliders 26 and 25. Therefore, as the sliders are moved towards each other, as previously described, the hoop 12 will be drawn tightly around the tread (or crown) of the tire with the result that pressures are applied at 11A and 11B as previously mentioned. The tire can then be inflated at inflation stem S. As soon as inflation occurs, pressure is exerted by the air pressure as indicated by arrows 10—10 and the service of the tensioning devices is no longer needed and it can be removed by turning crank 39—40 in a direction to move the sliders apart until the hoop 12 is loosened sufficiently to permit removal.

A feature of the present invention involves the provision of a friction reducing member between the hoop 12 and the tire tread surface TT of the tire. It is well known that metal does not slide well on dry rubber. The hoop members 12A and 12B slide with reference to members 18—21 and for best distribution of hoop tension it is also desirable that hoop members 12A and 12B be permitted to slide at least moderately relative to the tread surface in the region of the terminal ends 21A and 21B. In accordance with this invention a relatively loose metal shield is applied around the hoop. The shield is made of metal and hence has only a lower coefficient of friction in respect to the hoop than the hoop would have if it rested directly against the rubber tread of the tire. The shield around the hoop stands still relative to the tire tread as the hoop is drawn tight.

In the form shown in Figures 1, 4 and 10, the shield is simply loose spiral wrapping 48—49 of coarse wire around the hoop band members 12A and 12B. The wire is pre-formed as flattened spirals 48 and 49 and these are free to slide a reasonable amount on the bands 12A and 12B, respectively. Hence, as the hoop is tightened it creeps within the wire spirals 48—49 and hoop tension is uniformly distributed. The reverse is true upon loosening.

In the form shown in Figures 11 and 12 the hoop 12 is loosely encased with a sheet steel shell 50 which is made shorter than the minimum hoop circumference. The sheet steel shell 50 is bent so as loosely to encase the hoop 12 and is slitted at intervals at 51—51 to increase the flexibility of the shell. Two shells 50 are provided one on each of the hoop members 12A and 12B, each shell 50 being slightly shorter than the arcuate distance from the end of member 21 around to junction plate 14 when the device is adjusted to its smallest tire size, i.e., when the sliders are brought towards each other as closely as possible.

Another feature of the invention is the adjustability occasioned by movement of bolts 45 and 46 in slots 26D and 25D, respectively. In order to serve the smallest size tire both bolts 45 and 46 are brought up to and hooked into the notches 25E and 26E, this position being shown in Figure 1. The movement of sliders 25 and 26 is then sufficient to provide more than sufficient compressive movement for handling all tires within this "small size" position. For handling the next larger size of tires, one or the other bolts 45 or 46 is removed from its notch (25E or 26E, see Figure 4) and is allowed to slide out to the end of its slots in the slider. This is shown in Figure 4, where bolt 46 is still in its notch 25E but bolt 45 has been permitted to slide out to the limit of slot 26D (i.e., to the left in Figure 4). This permits handling tires of intermediate circumference size. For handling largest size tires, both bolts 45 and 46 are moved out to the limit of movement in their notches. Thus, in Figure 4, bolt 46 would be snapped out of notch 25E and permitted to move out to the (right) end of slot 25D. In any position the tightening down of the wing nuts 33 on the bolts 45 and 46 will serve to hold the adjusted position.

If desired, additional brackets similar to 14 in Figure 1 may be provided as at position 52, Figure 8, where the bracket 52 is fastened by rivet 24 or at position 54 where the bracket is simply welded at 55 onto the edge of under-strip 18. Brackets may be placed at either position if desired and will assist in holding the contrivance in place until tightened.

In the form shown in Figures 1–5 the sliders 25 and 26 are held between the parallel bars 18 and 21. Other forms of construction will be evident for accomplishing the operation. Thus in Figure 6, a base band 60, which would correspond to 18 in Figures 1 and 4, is provided and has upwardly and inwardly curled edges 61—62, slitted at intervals after the manner of Figure 12 to provide flexibility. The slider 64 has a base 65 with protruding edges engaged in the edges 61 and 62. Use of an additional strip 66, in Figure 6 (corresponding to member 21 of Figures 1 and 4) is optional.

Figures 6, 7:
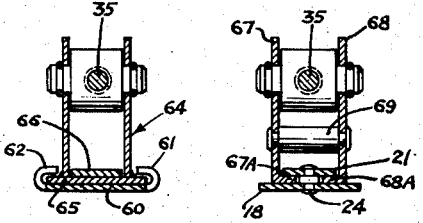
Figures 6 and 7 are sectional views of two slightly modified forms of construction, these views corresponding to the section shown in Figure 3, but not illustrating the tire.
Figure 5:
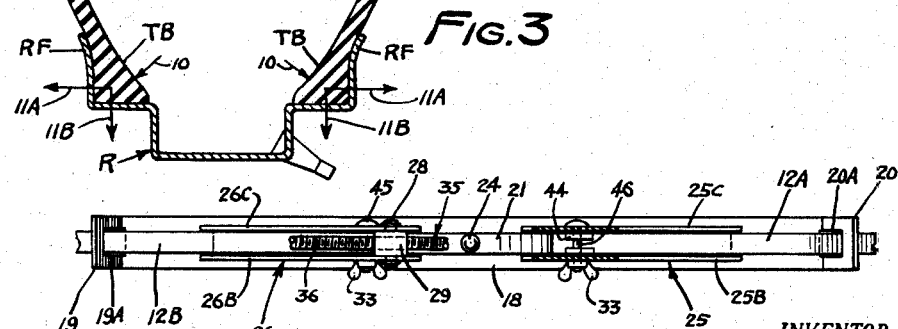
Figure 5 is a fragmentary side elevational view of the tire bead expander, shown separated from the tire, this view being partly in section as along the line and in the direction of arrows 5—5 of Figure 1.

In Figure 7 the two members 18 and 21 are provided and riveted together at 24, as in Figures 1 and 4. However, the slider is made of two separated side plates 67 and 68 solidly attached together by several spacer rivets 69. Each side plate 67 and 68 is provided with an inturned lower flange as at 67A and 68A, which are guided by the spaced members 21 and 18.

As many variations in mode of construction of the apparatus herein illustrated and described will suggest themselves to those skilled in the art, the invention is not limited except as defined in the appended claims.

What I claim is:

1. A tool for circumferentially contracting a tubeless tire casing in order preliminarily to set the beads thereof against the flanges of a cooperating rim preparatory to inflation comprising, a longitudinally curved and transversely flat elongated tread contact strap shaped to extend along an arc of the tire casing circumference with its inner concave surface in contact with the tire tread and having an exterior convex surface, said plate having outwardly turned ends with eyes therein; a slider guide strap curved to overlie the tread contact strap and having a length so as to have its opposite ends extend through the eyes and thence beyond and into contact with the tire casing circumference beyond said eyes, means for fastening said straps together at about their middles and for holding them spaced radially in respect to the casing, a pair of sliders, each of U-shaped channel having a bottom web between said straps and flanges extending outwardly beyond said slider guide strap, a band of flat strip bent so as to have its end portions brought together and with said end portion slideably inserted through said eyes in a position outwardly and over the ends of said slider guide strap in said eyes, means attaching said inserted ends of said band to said sliders, one end being attached to each slider, a screw threaded rod having one end threadedly attached to at least one slider and passing through the other slider for positively moving the sliders toward and away from each other and a flexible cover over the band throughout most of its length.

2. The tool specified in claim 1 further characterized in that means is provided for detachably securing the ends of the band to the sliders at diverse places for effectively shortening or lengthening the band length to accommodate tire casings of various circumferences.

3. A tool for circumferentially contracting the tubeless tire casing in order preliminarily to set the beads thereof against the flanges of a cooperating rim preparatory to inflation comprising, an arcuate frame having an exterior convex surface and an interior concave surface, the latter surface being shaped approximately to conform to the tread circumference of the casing with which the tool is used and subtend a circumferential arc thereof which is substantially less than one-half the tread circumference of said casing, said frame being constructed of material sufficiently flexible so as to be bendable to conform to the concave surface thereof to the tread circumference of a range of tire sizes for which the tool is designed, a pair of sliders mounted one on each side of the middle of said arcuate frame and on the convex surface thereof and each mounted for sliding movement only along a path of travel along said exterior surface, threaded shaft means connecting the sliders for moving them toward or away from each other, said shaft having a crank at at least one end for rotating it, a band of flexible strap material having greater width than thickness and curved so as to have its ends brought toward each other and having its end connected respectively, one end to each of said sliders so as to be pulled or let out by movement of the sliders toward or away from each other, guides at the ends of the arcuate frame through which the band is adapted to slide for holding the band against deflection out of a plane common to the arcuate frame and band, and a flexible metal shield bent around the band and made moveably lengthwise of the band so as to form a bearing on which the band can slide as it is tightened on the tread circumference of a tire.

References Cited in the file of this patent
UNITED STATES PATENTS

| | | |
|---|---|---|
| 727,651 | Loetscher | May 12, 1903 |
| 734,512 | Christopher | July 28, 1903 |
| 1,179,363 | Strickert | Apr. 11, 1916 |
| 1,779,806 | Dunwoodie | Oct. 28, 1930 |
| 1,897,644 | Rothamel | Feb. 14, 1933 |
| 1,966,580 | Bull | July 17, 1934 |
| 2,149,395 | Glynn | Mar. 7, 1939 |
| 2,192,227 | Hill | Mar. 5, 1940 |
| 2,341,828 | Tetalaff | Feb. 15, 1944 |
| 2,517,461 | Carlile | Aug. 1, 1950 |
| 2,684,112 | Coats | July 20, 1954 |